(12) United States Patent
Peng et al.

(10) Patent No.: US 11,024,047 B2
(45) Date of Patent: Jun. 1, 2021

(54) CAMERAS AND DEPTH ESTIMATION OF IMAGES ACQUIRED IN A DISTORTING MEDIUM

(71) Applicant: The Regents of the University of California, Oakland, CA (US)

(72) Inventors: Yan-Tsung Peng, New Taipei (TW); Pamela Cosman, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 418 days.

(21) Appl. No.: 15/759,106

(22) PCT Filed: Sep. 15, 2016

(86) PCT No.: PCT/US2016/051897
§ 371 (c)(1),
(2) Date: Mar. 9, 2018

(87) PCT Pub. No.: WO2017/048927
PCT Pub. Date: Mar. 23, 2017

(65) Prior Publication Data
US 2018/0286066 A1    Oct. 4, 2018

Related U.S. Application Data

(60) Provisional application No. 62/220,306, filed on Sep. 18, 2015.

(51) Int. Cl.
*G06T 7/586* (2017.01)
*G06T 7/571* (2017.01)
(Continued)

(52) U.S. Cl.
CPC .............. *G06T 7/586* (2017.01); *G06T 5/002* (2013.01); *G06T 5/005* (2013.01); *G06T 5/20* (2013.01);
(Continued)

(58) Field of Classification Search
CPC ......... G06T 7/586; G06T 5/005; G06T 7/571; G06T 5/20; G06T 5/002; G06T 7/90;
(Continued)

(56) References Cited

U.S. PATENT DOCUMENTS 6,791,540 B1 *  9/2004  Baumberg .............. G06T 15/10
                                                    345/419
8,059,911 B2 * 11/2011  Chen ........................ G06T 5/20
                                                    382/266

(Continued)

OTHER PUBLICATIONS

Soonmin Bae and Fredo Durand, "Defocus Magnification", Eurographics 2007, vol. 26, No. 3, pp. 571-579.
(Continued)

*Primary Examiner* — Xuemei G Chen
(74) *Attorney, Agent, or Firm* — Greer, Burns & Crain, Ltd.; Steven P. Fallon (57) ABSTRACT

The invention provides a method for depth estimation in image or video obtained from a distorting medium. In the method, a pixel blurriness map is calculated. A rough depth map is then determined from the pixel blurriness map while assuming depth in a small local patch is uniform. The rough depth map is then refined. The method can be implemented in imaging systems, such as cameras or imaging processing computers, and the distorting medium can be an underwater medium, haze, fog, low lighting, or a sandstorm, for example. Preferred embodiments determined the blurriness map by calculating a difference between an original image and multi-scale Gaussian-filtered images to estimate the pixel blurriness map.

18 Claims, 3 Drawing Sheets

(51) Int. Cl.
*G06T 5/00* (2006.01)
*G06T 7/90* (2017.01)
*G06T 5/20* (2006.01)
*H04N 5/225* (2006.01)
*H04N 5/232* (2006.01)

(52) U.S. Cl.
CPC ............... *G06T 7/571* (2017.01); *G06T 7/90* (2017.01); *H04N 5/2252* (2013.01); *H04N 5/23229* (2013.01); *G06T 2207/10016* (2013.01); *G06T 2207/10024* (2013.01)

(58) Field of Classification Search
CPC .......... G06T 2207/10024; G06T 2207/10016; H04N 5/23229; H04N 5/2252
See application file for complete search history.

(56) References Cited

U.S. PATENT DOCUMENTS

| | | | | |
|---|---|---|---|---|
| 8,619,082 | B1* | 12/2013 | Ciurea | H04N 13/232 |
| | | | | 345/427 |
| 8,736,707 | B2* | 5/2014 | Li | H04N 5/23212 |
| | | | | 348/222.1 |
| 8,929,607 | B2* | 1/2015 | Li | G06T 7/571 |
| | | | | 382/106 |
| 9,030,466 | B2* | 5/2015 | Uehira | G01B 11/2513 |
| | | | | 345/419 |
| 9,129,015 | B1* | 9/2015 | Sharifi | G06F 16/683 |
| 9,294,662 | B2* | 3/2016 | Vondran, Jr. | H04N 5/23229 |
| 9,307,221 | B1* | 4/2016 | Tang | H04N 5/23222 |
| 9,560,259 | B2* | 1/2017 | Tu | H04N 5/23212 |
| 9,581,436 | B2* | 2/2017 | Ishihara | H04N 5/23212 |
| 9,639,948 | B2* | 5/2017 | Morgan-Mar | G06T 7/579 |
| 10,489,928 | B2* | 11/2019 | Shamilov | H04N 5/2256 |
| 10,528,842 | B2* | 1/2020 | Lin | G06K 9/6298 |
| 2003/0038876 | A1* | 2/2003 | Nagashima | H04N 7/183 |
| | | | | 348/81 |
| 2007/0036427 | A1* | 2/2007 | Nakamura | G02B 27/0075 |
| | | | | 382/154 |
| 2007/0230756 | A1* | 10/2007 | Wen | G01S 7/52034 |
| | | | | 382/128 |
| 2008/0303894 | A1* | 12/2008 | Ernst | H04N 13/261 |
| | | | | 348/43 |
| 2009/0010546 | A1 | 1/2009 | Rossato et al. | |
| 2009/0295933 | A1* | 12/2009 | Schechner | G06T 5/007 |
| | | | | 348/222.1 |
| 2010/0080481 | A1* | 4/2010 | Chen | G06T 7/529 |
| | | | | 382/255 |
| 2010/0164731 | A1* | 7/2010 | Xie | G06K 9/00771 |
| | | | | 340/573.1 |
| 2010/0316284 | A1* | 12/2010 | Jeong | G06T 5/002 |
| | | | | 382/162 |
| 2011/0188775 | A1* | 8/2011 | Sun | G06K 9/40 |
| | | | | 382/274 |
| 2011/0193860 | A1* | 8/2011 | Lee | H04N 13/261 |
| | | | | 345/419 |
| 2012/0039525 | A1* | 2/2012 | Tian | H04N 13/271 |
| | | | | 382/154 |
| 2012/0056887 | A1* | 3/2012 | Kim | G06T 7/529 |
| | | | | 345/426 |
| 2012/0230400 | A1 | 9/2012 | Lu et al. | |
| 2013/0069932 | A1* | 3/2013 | Ha | H04N 13/261 |
| | | | | 345/419 |
| 2013/0070050 | A1* | 3/2013 | Ha | H04N 13/261 |
| | | | | 348/43 |
| 2013/0077852 | A1* | 3/2013 | Chang | G06T 7/593 |
| | | | | 382/154 |
| 2013/0136378 | A1* | 5/2013 | Finlayson | G06T 5/00 |
| | | | | 382/279 |
| 2014/0028678 | A1* | 1/2014 | Chmielewski | G06T 5/002 |
| | | | | 345/426 |
| 2014/0085413 | A1* | 3/2014 | Matsumoto | H04N 13/128 |
| | | | | 348/42 |
| 2014/0086476 | A1* | 3/2014 | Ferens | G06T 5/50 |
| | | | | 382/154 |
| 2014/0328512 | A1* | 11/2014 | Gurwicz | G06K 9/6263 |
| | | | | 382/103 |
| 2015/0043806 | A1 | 2/2015 | Karsch et al. | |
| 2016/0104291 | A1* | 4/2016 | Zhou | G06T 7/11 |
| | | | | 382/173 |
| 2016/0171704 | A1* | 6/2016 | Raghoebardajal | G06T 7/50 |
| | | | | 345/633 |
| 2016/0255323 | A1* | 9/2016 | Wajs | H04N 9/07 |
| | | | | 348/49 |
| 2016/0267670 | A1* | 9/2016 | Sun | G06T 7/571 |
| 2016/0295098 | A1* | 10/2016 | Li | H04N 5/23212 |
| 2017/0188008 | A1* | 6/2017 | Kim | G06T 5/002 |
| 2018/0067197 | A1* | 3/2018 | Schockaert | G06T 5/002 |

OTHER PUBLICATIONS

Liu Chao and Meng Wang, "Removal of Water Scattering", Proc. IEEE International Conference Comput. Engin. and Tech. (ICCET), vol. 2, pp. 35-39, Apr. 2010.

John Y. Chiang and Ying-Ching Chen, "Underwater Image Enhancement by Wavelength Compensation and Dehazing", IEEE Transactions on Image Processing, vol. 21, No. 4, pp. 1756-1769, Apr. 2012.

Kanjar DE and V. Masilamani, "Image Sharpness Measure for Blurred Images in Frequency Domain", Procedia Engineering, International Conference on Design and Manufacturing, IConDM 2013, vol. 64, pp. 149-158.

P. Drews Jr. et al., "Transmission Estimation in Underwater Single Images", 2013 IEEE International Conference on Computer Vision Workshops, pp. 825-830.

Kaiming HE et al., "Guided Image Filtering", IEEE Trans. Pattern. Anal. Mach. Intell., vol. 35, No. 6, pp. 228-242, Oct. 2012.

Kaiming HE et al., "Single Image Haze Removal Using Dark Channel Prior", IEEE Trans. Pattern. Anal. Mach. Intell., vol. 33, No. 12, pp. 2341-2353, Dec. 2011.

Anat Levin et al., "A Closed-Form Solution to Natural Image Matting", IEEE Trans. Pattern. Anal. Mach. Intell., vol. 30, No. 2, pp. 228-242, Feb. 2008.

Anat Levin et al., "Colorization using Optimization", ACM Trans. on Graphics vol. 23, No. 3, pp. 689-694, 2004.

Yan-Tsung Peng et al., "Single Underwater Image Enhancement Using Depth Estimation Based on Blurriness", Proc. IEEE Inter. Conf. on Imag. Process. (ICIP), pp. 4952-4956, Sep. 2015.

Haocheng Wen et al., "Single Underwater Image Enhancement with a New Optical Model", Proceedings IEEE International Symposium Circ. and Syst., (ISCAS), pp. 753-756, May 2013.

Hung-Yu Yang et al., "Low Complexity Underwater Image Enhancement Based on Dark Channel Prior", 2011 Second International Conference on Innovations in Bio-inspired Computing and Applications, pp. 17-20.

Lee W. Young, International Search Report for Application No. PCT/US2016/051897, dated Dec. 7, 2016.

Xinwei Zhao et al., "Deriving inherent optical properties from background color and underwater image enhancement", Ocean Engineering, vol. 94, pp. 163-172, Dec. 20, 2014.

* cited by examiner

FIG. 1

Algorithm 1 BL-Estimate

1: Input parameter: input image $I^c$, blurriness map $P_{blr}$.
2: Output parameter: estimated BL $\overline{B^c}$.
3:
4: function BL-ESTIMATE($I^c$, $P_{blr}$)
5:     $B^c_{cand_1} \leftarrow \text{avg}_x \left[\text{QUAD-SELECT-LV}(I^c)\right]$;
6:     $B^c_{cand_2} \leftarrow \text{avg}_x \left[\text{QUAD-SELECT-LB}(I^c, P_{blr})\right]$;
7:     $B^c_{cand_3} \leftarrow \frac{1}{|P_{0.1\%}|} \sum_{x \in P_{0.1\%}} I^c(x)$;
8:     $B^c_{max} \leftarrow \max_{i \in \{1,2,3\}} B^c_{cand_i}$;
9:     $B^c_{min} \leftarrow \min_{i \in \{1,2,3\}} B^c_{cand_i}$;
10:     for $k \in \{r, g, b\}$ do
11:         $\alpha \leftarrow S(\frac{|I^k > 0.5|}{\text{Size}(I^k)}, \epsilon_n)$;
12:         $\overline{B^k} \leftarrow \alpha B^k_{max} + (1-\alpha) B^k_{min}$;
13:     end for
14:     return $\overline{B^c}$;
15: end function
16:
17: function QUAD-SELECT-LB($I^c$, $P_{blr}$)
18:     $I_{gray} \leftarrow \text{rgb2gray}(I^c)$;
19:     $I_q \leftarrow I_{gray}$;
20:     while $\frac{\text{Size}(I_q)}{\text{Size}(I_{gray})} > \epsilon_s$ do
21:         Partition $I_q$ into four quadrants, $I_q^1, I_q^2, I_q^3,$ and $I_q^4$;
22:         Pick $I_q^n$ with largest blurriness computed using $P_{blr}$;
23:         $I_q \leftarrow I_q^n$;
24:     end while
25:     return $I^c(\text{Position}(I_q))$;
26: end function

CAMERAS AND DEPTH ESTIMATION OF IMAGES ACQUIRED IN A DISTORTING MEDIUM

PRIORITY CLAIM AND REFERENCE TO RELATED APPLICATION

The application claims priority under 35 U.S.C. § 119 and all applicable statutes and treaties from prior provisional application Ser. No. 62/220,306, which was filed Sep. 18, 2015.

STATEMENT OF GOVERNMENT INTEREST

The invention was made with support under grant number CCF-1160832 awarded by the National Science Foundation. The government has certain rights in the invention.

FIELD

Fields of the invention include camera systems and image reconstruction, particularly for images and videos acquired in a distorting medium. Particular applications of the invention include underwater photography and video and reconstruction of images and videos acquired underwater.

BACKGROUND

Underwater images or videos often suffer from visible degradation and color distortion due to the propagated light attenuated with distance from the camera, primarily resulting from absorption and scattering effects. Acquired images and videos often suffer from poor contrast and details of images and video frames are often lost, even after efforts toward reconstruction of the images or videos. Similarly, other distorting media, such as fog, haze and other liquids created visible degradation and color distortion from absorption and scattering effects.

Prior methods for reconstruction of underwater images estimate depth based upon particular color channels. Some previous methods use the image formation model (IFM) to estimate the background light and the transmission map based on depth estimation. These methods still provide images with poor contrast. Some of these methods use a dark channel prior (DCP) to derive scene depth and remove haze in natural terrestrial images by calculating the amount of spatially homogeneous haze using the darkest channel in the scene. H. Yang, P. Chen, C. Huang, Y. Zhuang and Y. Shiau, "Low complexity underwater image enhancement based on dark channel prior," Int. Conf. Innov. in Bio-inspired Comput. and App. (IBICA), pp. 17-20, December 2011. 17-20, (2011); L. Chao and M. Wang, "Removal of water scattering," in Proc. IEEE Int. Conf. Comput. Engin. and Tech. (ICCET) vol. 2, pp. 35-39 (April 2010). With the DCP approach, points in the scene closer to the camera have a shorter path over which scattering occurs, and dark pixels therefore experience less brightening from scattered light. This observation is used to estimate depth.

Some DCP approaches use only the blue and green channels. See, e.g., H. Wen, et al., "Single underwater image enhancement with a new optical model," in Proc. IEEE Int. Symp. Circ. & Syst. (ISCAS), pp. 753-756 (May 2013); P. Drews, et al, "Transmission Estimation in Underwater Single Images," in Proc. IEEE Int. Conf. Comput. Vis. Workshops (ICCVW), pp. 825-830 (December 2013). The theory in these approaches is that red light attenuates faster due to its longer wavelength and the blue and green channels therefore provides necessary priors for image restoration.

The inventors have determined that light absorption and different lighting conditions existing in underwater images and other distorting media can create exceptions to those priors. When such exceptions exist, the resulting image restoration based on the priors can be poor.

SUMMARY OF THE INVENTION

An embodiment of the invention is a method for depth estimation in image or video obtained from a distorting medium. In the method, a pixel blurriness map is calculated. A rough depth map is then determined from the pixel blurriness map while assuming depth in a small local patch is uniform. The rough depth map is then refined. The method can be implemented in imaging systems, such as cameras or imaging processing computers, and the distorting medium can be an underwater medium, haze, fog, low lighting, or a sandstorm, for example. Preferred embodiments determined the blurriness map by calculating a difference between an original image and multi-scale Gaussian-filtered images to estimate the pixel blurriness map.

DETAILED DESCRIPTION OF THE PREFERRED EMBODIMENTS

Preferred embodiments of the invention include camera systems that acquire still images and/or video. The systems include software stored on a non-transient medium for reconstructing images and videos to enhance the images and videos from distortion caused by a distorting surrounding medium. Systems and methods of the invention are applicable, for example, to underwater photography and video acquisition, and to photography and video acquisition from other distorting media, such as fog, haze, dimly lit images and sandstorm images. Methods of the invention can be performed within cameras or video acquisition equipment, and can also be performed by image/video processing and adjustment software on non-transient medium executed by a computer.

Preferred methods for depth estimation of distorted medium images in video use image blurriness to estimate scene depth. A preferred embodiment leverages a recognition of the inventors that larger scene depth causes more object blurriness for distorted medium images, e.g. underwater images. Preferred methods estimate background light first, and then perform depth estimation and transmission map estimation based on the estimated background light so as to adaptively produce the more accurate scene depth and transmission map for an underwater image. The inventors have determined that background light is a key individual factor to decide the effectiveness of the depth estimation methods based on color channels for underwater images. This depth estimation can enhance image reconstruction.

Additional preferred methods for reconstruction provide a unified medium depth estimation based on image blurriness and light absorption. The extended method provides unified underwater depth estimation based on image blurriness and light absorption that works well in different lighting conditions and hues of water. Unlike other methods, preferred methods of the invention perform depth estimation based on background light estimation so as to adaptively produce the more accurate scene depth for underwater image restoration.

Preferred methods of the invention have been shown to work well in different lighting conditions and hues of water. Preferred methods use background light estimation to estimate scene depth and can therefore adaptively produce an accurate scene depth for image restoration, of images acquired in a distorting medium such as water.

A preferred depth estimation method makes a pixel blurriness estimation. A difference between an original and a multi-scale Gaussian-filtered image is calculated to estimate the pixel blurriness map. A rough depth map is generated by applying a maximum filter to the pixel blurriness map while assuming depth in a small local patch is uniform. Closing by morphological reconstruction and guided filtering are then used to refine the depth map.

Those knowledgeable in the art will appreciate that embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc.

Preferred embodiments are discussed with respect to the RGB color space. Artisans will appreciate that the invention is applicable to arbitrary color spaces.

Preferred embodiments use image blurriness to estimate scene depth. One technique for estimating blurriness is provided in S. Bae and F. Durand, "Defocus magnification," in Proc. Comput. Graph. Forum., vol. 26, no. 3, pp. 571-579 (2007). This is a scale edge detector to estimate pixel blurriness, and then defocus map is generated by using edge aware interpolation. See, A. Levin, D. Lischinski, and Y. Weiss, "Colorization using optimization," ACM Trans. on Graphics 23(3), pp. 689-694 (2004). In constructing the defocus map, the blurriness at non-edge pixels is interpolated and propagated by neighbouring edge pixels based on the similarities of luminance. If matting Laplacian [A. Levin, D. Lischinski, and Y. Weiss, "A Closed-Form Solution to Natural Image Matting," IEEE Trans. Pattern Anal. Mach. Intell., vol. 30, no. 2, pp. 228-242, (February 2008)] is applied to perform the interpolation, noise and low contrast may cause incorrect blurriness propagation, especially for underwater image. The edge-aware interpolations are computationally expensive because the methods require solving high-dimension linear equations. Preferred methods therefore construct the defocus map using closing by morphological reconstruction (CMR). See, P. Soille, "Morphological Image Analysis: Principles: and Applications," Springer-Verlag, pp. 173-174 (1999).

Preferred embodiments of the invention will now be discussed with respect to the drawings and with respect to experiments that have been conducted to demonstrate the invention. The drawings may include schematic representations, which will be understood by artisans in view of the general knowledge in the art and the description that follows. Features may be exaggerated in the drawings for emphasis, and features may not be to scale. Artisans will understand broader aspects of the invention from the experiments and experimental data.

Figure 1:
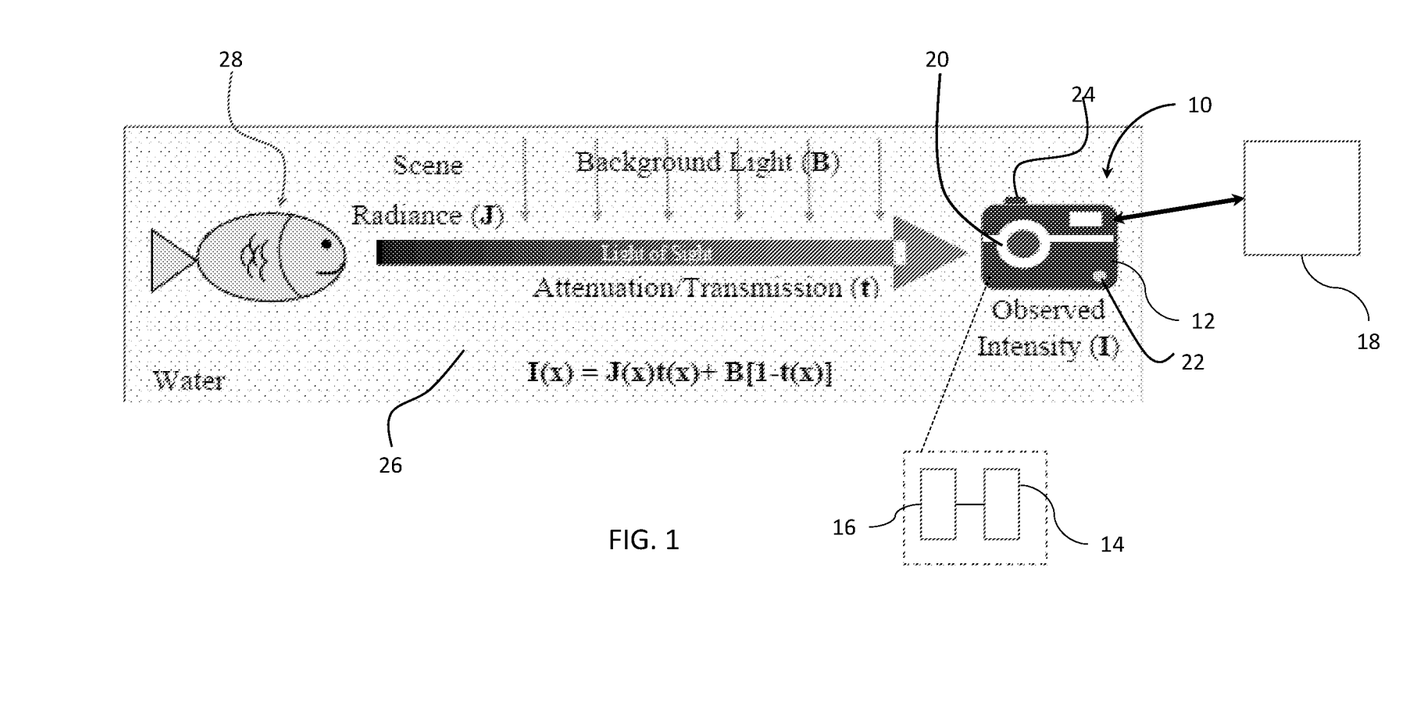
FIG. 1 illustrates a preferred embodiment system for depth estimation of images acquired in a distorting medium.

FIG. 1 illustrates a preferred embodiment system of the invention. A camera 10 obtains images or video. The camera 10 is an underwater camera in preferred embodiments, and includes a sealed housing 12. The camera further includes memory 14 for storing images, and a processor 16 for controlling camera functions. The processor 16 also can run software that processes images or video that is obtained prior to and after storing, and can control transfer of images via wired or wireless connection to another devices, such as a computer 18. The computer 18 can include image processing/adjustment software. Either or both of the processor 16 and the computer 18 can perform present methods for estimating depth and image restoration. The camera 10 also includes a lens 20, light meter 22 and operator controls 24.

The camera 10 is illustrated in a distorting medium of water 26 that separates the lens 20 from a scene 28. This makes the observed intensity I a distorted version of the scene radiance J. Specifically, $$I(x)=J(x)t(x)+B^c(1-t(x)),  \quad (1)$$

where I is the observed intensity of the input image at pixel x, J is the scene radiance, $B^c$ is the background light (BL), and t is the is the transmission medium map that describes the portion of the scene radiance that is not scattered or absorbed and reaches the lens 20 of camera 10. In this model, the transmission map is the depth map, i.e., smaller t means the scene point is farther from the camera.

Prior DCP methods are focused upon outdoor scenes taken above ground and recover the scene radiance J with a statistical observation that about three quarters of the pixels in non-sky pates of outdoor images have zero values in the dark channel. This can be written as follows (taken from K. He et. al, "Single image haze removal using dark channel prior," IEE Trans. Pattern Anal. Mach. Intell., vol. 33, no 12, pp. 2341-53 (December 2011).

$$\min_{y \in \Omega(x)} \left\{ \min_{c \in \{R,G,B\}} J^C(y) \right\} = 0, \quad (2)$$

where $\Omega(x)$ is the local patch centered at x, and $J^C$ is the intensity of the scene radiance in channel c, where c is one of the R, G, B channels. The minimum operator of Eq. 2 can be applied to both sides of Eq. 1, which produces:

$$t(x) = 1 - \min_{y \in \Omega(x)} \left\{ \min_{c \in \{R,G,B\}} \frac{I^c(y)}{B^c} \right\}, \quad (3)$$

The depth map has block-like artifacts. These can be filter via techniques such as image matting (A. Levin et al, "A Closed-Form Solution to Natural Image Matting," IEEE Trans. Pattern. Anal. Mach. Intell., vol. 30, no. 2, pp. 228-242 (February 2008) or guided filtering (K. He, "Guided Image Filtering,". IEEE Trans. Pattern. Anal. Mach. Intell., vol. 35, no. 6, pp. 228-242 (October 2012).

The dark channel of the input image can be defined as $$I_{dark}(x) = \min_{y \in \Omega(x)} \{\min_c I^C(y)\}.$$

To estimate the BL $\widetilde{B^c}$, the top 0.1% brightest pixels in $I_{dark}$ are selected. The corresponding intensities in the input image are averaged. This effectively obtains BL from the 0.1% most distant scene points. If $S_{0.1}$ is the set of the 0.1% brightest pixels, then BL can be calculated as $$\widetilde{B^c} = \frac{1}{|S_{0.1}|} \sum_{x \in S_{0.1}} I^C(x), c \in \{r, g, b\}, \tag{4}$$

Then, the scene radiance J can be recovered by placing I, t, and β into Eq. 1, as follows:

$$J(x) = \frac{I(x) - \overline{B^c}}{\max(t(x), r_o)} + B^c, \tag{5}$$

where $r_o$ is typically set ranging from 0.3 to 0.5. The value is chosen empirically to increase the exposure of J for display. This prior DCP method is effective in some cases but fails in others. The failure case can produce images missing a great amount of detail, especially when a foreground object (close object) has very bright features, which are mistakenly treated as being distant.

Preferred methods of the invention avoid such issues. In a preferred method, a blurriness estimate is obtained. The blurriness estimate can be determined from prior technique for blurriness, including those mentioned above. Preferred methods include multi-scale low-pass filtering to determine blurriness and multi-scale Gaussian-filtered images to determine blurriness. Another approach is to measure blurriness in the frequency domain. The frequency domain approach. See, Kanjar and Masilamani, "Image Sharpness Measure for Blurred Images in Frequency Domain," International Conference on Design and Manufacturing, Volume 64, Pages 149-158 (2013).

The preferred Gaussian-filtered images will be discussed as a detailed example. In the example, a difference between an original and multi-scale Gaussian-filtered images is calculated to estimate a pixel blurriness map. A rough depth map is then generated by applying a maximum filter to the pixel blurriness map while assuming depth in a small local patch is uniform. The rough depth map is refined, such as by guided filtering or image matting. See, K. He, "Guided Image Filtering,". IEEE Trans. Pattern. Anal. Mach. Intell., vol. 35, no. 6, pp. 228-242 (October 2012); Levin et al, "A Closed-Form Solution to Natural Image Matting," IEEE Trans Pattern Anal Mach Intell. 30(2):228-42 (2008). Experiments compared the present method to the dark channel prior methods (DCP) maximum intensity prior (MIP) discussed in the background. Qualitative and quantitative measures were evaluated in different underwater lighting conditions. The experiments showed that the depth estimation based upon blurriness worked well for a variety of images, and provided better results with reasonable computation costs, whereas the prior methods sometimes fail to distinguish between background and foreground and sometimes cause color distortion and poor global contrast.

The pixel blurriness map can be calculated as follows. $G^{k,\sigma}$ is the input image filtered by a k x k spatial Gaussian filter with variance $\sigma^2$. The pixel blurriness map $P_{init}$ is computed as:

$$P_{init}(x) = \frac{1}{n} \sum_{i=1}^{n} (|I_g(x) - G^{r_i, r_i}(x)|) \tag{6}$$

where $r_i = 2^i n + 1$ and $I_g$ is the grayscale version of the input image $I^C$. As an example, we can assign n=4. This assignment can be altered based upon factors that include image resolutions and image characteristic (quality, sharpness, etc.). The assignment can also be dependent upon the precision of blurriness estimation. There is a tradeoff between precision and computational cost. Generally, a larger n results in a more precise estimation and higher computation cost than a lower n. A preferred range of n for a 1280×720 image is 1-6.

The max filter can be applied to B to calculate a rough depth map $P_r$ as:

$$P_r(x) = \max_{y \in \Omega(x)} P_{init}(y), \tag{7}$$

where $\Omega(x)$ is a z×z local patch centered at x. As an example, we set z=7. More generally, a patch size of z=7 to z=31 works well for image sizes ranging from 800×600 to 1280×720. The value of z is can be determined by image resolutions and image contents, such as the size of objects in the image. For example, a larger z does not work well for small objects, which could cause halo effects around such objects in the restored image. According to experiments that were conducted, we found a patch size of z=7 to z=31 works well for image sizes ranging from 800×600 to 1280×720. Generally, an image with a higher resolution requires a larger z, i.e., z preferably increases with image resolution. The rough depth map $P_r$ can then be refined. One option for refinement is hole filling, which can fill holes caused by the flat regions in objects during the closing by morphological reconstruction (CMR).

Specifically, refine $P_r$ by filling holes caused by flat regions in objects using morphological reconstruction followed by soft matting or guided filtering applied to generate a refined blurriness map $P_{blr}$ $$P_{blr}(x) = F_g\{C_r[P_r(x)]\}, \tag{8}$$

where $C_r$ is a hole-filling morphological reconstruction and $F_g$ represents soft matting or guided filtering.

Preferred embodiments modify the depth estimation above. This modification improves depth estimation, especially when red light content is significant. In this modification, a candidate selection process chooses from a plurality of candidate blurriness regions. There can be many regions that consist of a top predetermined percentage of blurry pixels, which are global to the image. A preferred candidate selection process selects from a top predetermined percentage of blurry pixels in the input image, a variance region within a predetermined lowest variance range and a blurriness region within a predetermined largest blurriness range. A specific preferred candidate selection process selects from among a predetermined number of background light (BL) candidates that are within a predetermined percentage of the top most blurry pixels, the lowest variance region and the largest blurriness region. The BL candidates are average values of the candidate regions. If three BL candidates are chosen, these correspond to three average pixel values of three BL candidate regions. For example, a preferred embodiment selects three BL candidates from the top 0.1% blurry pixels in the input image, the lowest variance region and the largest blurriness region. These candidate regions are preferably of equal size. For example, a preferred technique divides the input image I into four equally sized regions $I_q^1, I_q^2, I_q^3,$ and $I_q^4$ until $$\frac{\text{Size}(I_q)}{\text{Size}(I)} \leq \epsilon_s,$$

where $\epsilon_s = 2^{-10}$. The lowest variance region and the largest blurriness region (which may or may not be the same) can be determined, for example, by quadtree decomposition, which iteratively divides the input into a predetermined number of equal size blocks according to variance or blurriness, for example four equal sized blocks. The blurriness of a region can be obtained by averaging $P_{blr}$ (x) in the corresponding region in the blurriness map.

Figure 2:
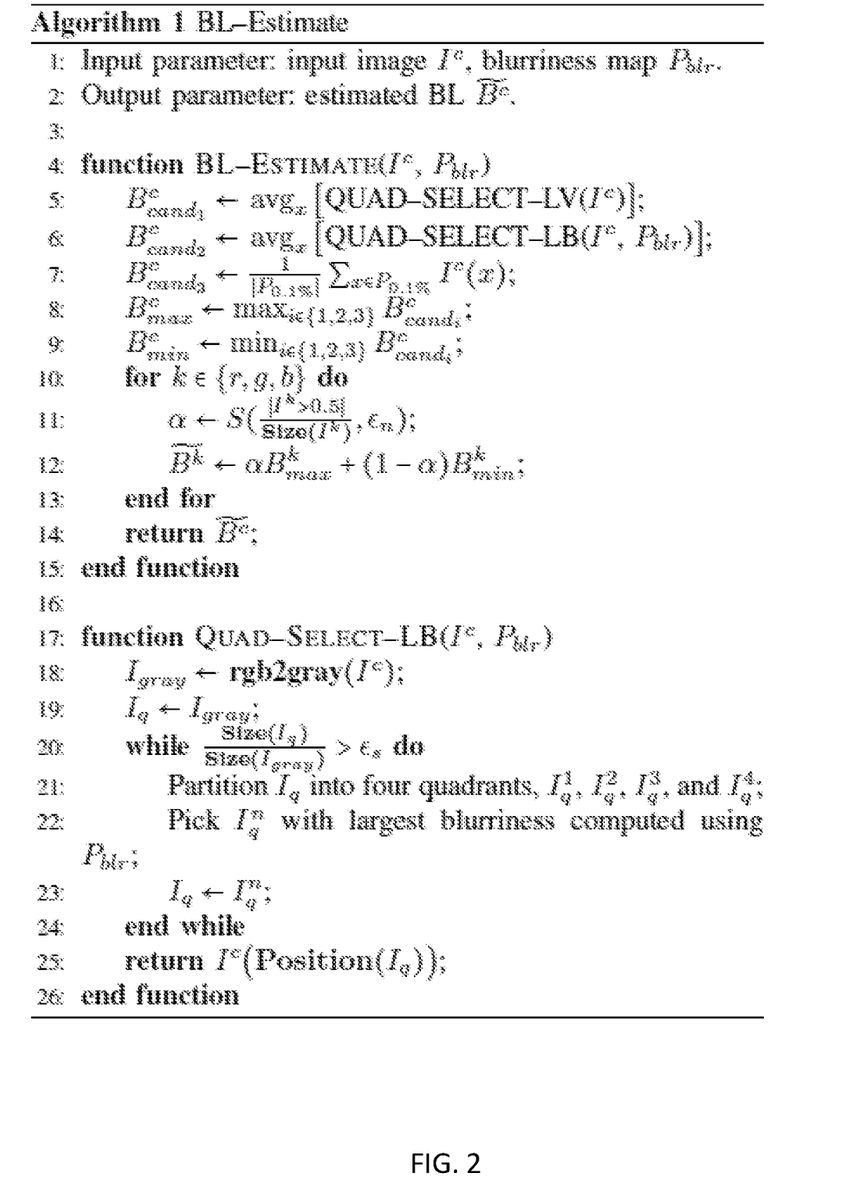
FIG. 2 provides pseudo code for selection of separate BL (background light) for separate color channels that is used in a preferred embodiment depth estimation method of the invention.
Figure 3:
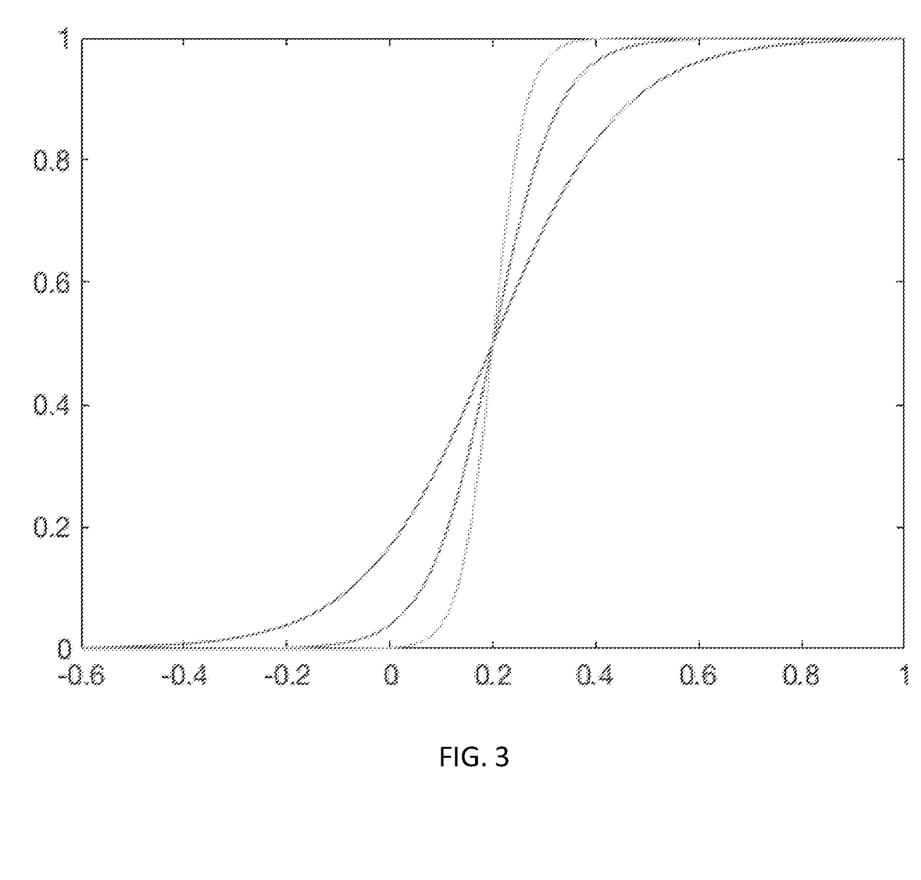
FIG. 3 shows a set of weighted combination curves illustrating (from left to right) curves plotted using different $s=8$, $s=16$, and $s=32$ for calculating the BL estimate.

After selection of the predetermined BL candidates, in this example, separate BL is then selected for each color channel according to the input image. FIG. 2 shows pseudo code for the selection. The code of FIG. 2 describes a preferred background light estimation based on image pixel variance and blurriness. The sigmoid function S in FIG. 2 is given by $$S(a,v)=[1+e^{-s(a-v)}]^{-1} \qquad (9)$$

where s is an empirical constant. In an example, s was set to 32. Ifs is small, the BL estimate is calculated using a smoother weighted combination. FIG. 3 shows a set of curves illustrating (from left to right) curves plotted using s=8, s=16, and s=32. Fixed thresholds are set with reference to the input image. For example, v is a threshold (we assign $v=\epsilon_n$) that determines whether the input image was taken under sufficient lighting. According to the percentage of bright pixels ($I^k > 0.5$), $$\left(\frac{|I^k > 0.5|}{\text{Size}(I^k)} \gg \epsilon_n\right)$$

represents the image has sufficient lighting. The value of $\epsilon_n$ can be determined empirically. Example threshold used in experiments were $\epsilon_s = 2^{-10}$ and $\epsilon_n = 0.2$. The quadrant selection lowest variance (QUAD-SELECT-LV) is similar to the quadrant selection with the largest blurriness (QUAD-SELECT-LB), except that largest blurriness is replaced with the lowest variance and there is no need to consider $P_{blr}$.

The function BL-ESTIMATE in FIG. 2 determines BL for each color channel between the darkest and brightest BL candidates according to the percentage of bright pixels, which for the example is the top 0.5% ($I^k > 0.5$). When the percentage of bright pixels in the input image is high enough $$\left(\frac{|I^k > 0.5|}{\text{Size}(I^k)} \gg \epsilon_n\right),$$

then the image is deemed to have sufficient lighting, and BL estimated as being brighter is more suitable. Generally, BL should be estimated as being brighter (with regard to the channel k) than most (at least a majority and preferably 50-90% or more) of pixels in the input image. The image is determined as having insufficient lighting with $$\left(\frac{|I^k > 0.5|}{\text{Size}(I^k)} \ll \epsilon_n\right),$$

and BL is estimated as darker. BL should be estimated as being darker (with regard to the channel k) than most (at least a majority and preferably 50-90% or more) of pixels in the input image. Between these extremes, the BL estimate can be calculated by a weighted combination of the darkest and brightest BL candidates. This selection process for the BL estimate followed by restoration has demonstrated visually pleasing results. Objective measures also reveal good performance.

In another modification, both image blurriness and light absorption are leveraged for the depth estimation. This method can be considered to leverage three different depth estimations that are then sigmoidally combined in view of lighting and image conditions.

A first estimate of depth is obtained directly from the red channel. The red channel map R is defined as:

$$R(x) = \max_{y \in \Omega(x)} I^r(y), \qquad (10)$$

From this, an estimate of depth is obtained:

$$\tilde{d}_R = 1 - F_s(R) \qquad (11)$$

where $F_s$ is a stretching function. The stretching function $F_s$ can be defined as:

$$F_s(V) = \frac{V - \min(V)}{\max(V) - \min(V)}, \qquad (12)$$

where V is a vector.

A second estimate of depth is:

$$\tilde{d}_D = 1 - F_s(D_{mip}) \qquad (13)$$

This estimation is based upon maximum intensity prior (MIP). The MIP can be determined through the different between the maximum intensity of the red channel compared to the green and blue channels, as follows:

$$D_{mip}(x) = \max_{y \in \Omega(x)} I^r(y) - \max_{y \in \Omega(x)} \{I^g(y), I^b(y)\} \qquad (14)$$

Large values of $D_{mip}(x)$ represent closer scene points having red light that attenuates less than that of farther scene points. This concept was applied by others to estimate the transmission map, while it is adapted here to estimate the depth directly.

A third estimation uses the image blurriness $P_r$ of Equation (7) to estimate depth. The third depth estimation based upon blurriness is defined as:

$$\tilde{d}_B = 1 - F_s(C_r(P_r)) \quad (15)$$

Combining the three estimates of questions (11), (13) and (15) provides for the estimation of depth in a distorted medium based upon light absorption and image blurriness according to the estimated BL $\tilde{B}^c$ and the average input red value according to the following:

$$\tilde{d}_n(x) = \Theta_b[\Theta_a \tilde{d}_D(x) + (1-\Theta_a)\tilde{d}_R(x)] + (1-\Theta_b)\tilde{d}_B(x) \quad (16)$$

where $\Theta_a = S(\text{avg}_C(\tilde{B}^c), 0.5)$ and $\Theta_b = S(\text{avg}_C(I^r), 0.1)$ are determined by the sigmoid function of Equation (9). After that the depth map is refined and smoothed, such as by soft matting or guided filtering, as discussed above. The resultant estimated depth map $d_n \in [0,1]$ can be considered as a map of normalized relative distance for the scene points of the image for any other image enhancement or adjustment processes to be conducted.

With this third variation, when the image has some reasonable level of red content overall, e.g., $\text{avg}(I^r) \gg 0.1$, and the background light is relatively dim, $\text{avg}(\tilde{B}^c) \ll 0.5$, then $\tilde{d}_R$ alone provides a good depth representation. In such case, $\Theta_a \approx 1$ and $\Theta_a \approx 1$, and $\tilde{d}_n(x) \approx \tilde{d}_R(x)$.

As BL gets brighter, the possibility that $\tilde{d}_R(x)$ fails to represent scene depth gets higher. Because the BL accounts for more of the observed intensity for a scene point farther from the camera, far scene points may still have large values in the red channel and be wrongly judged as being close according to Equation (11). When an underwater image has a brighter BL, then $\tilde{d}_D$ is more reliable for scene depth. The red light of a farther scene point is absorbed more compared to the green and blue light. For this reason, when the image has some reasonable level of red content overall $\text{avg}(I^r) \gg 0.1$ and the background is relatively bright ($\tilde{B}^c \gg 0.5$) then $\tilde{d}_D$ is itself a good measure of depth. In such case, $\Theta_a \approx 1$ and $\Theta_b \approx 1$, and $\tilde{d}_n(x) \approx \tilde{d}_D(x)$.

When there is very little red light $\text{avg}(I^r) \ll 0.1$ then both Equations (13) and (15), which directly use red channel values are likely to fail to estimate scene depth properly. In this case, and $\Theta_b \approx 0$, and $\tilde{d}_n(x) \approx \tilde{d}_B(x)$. mean that the depth estimation reverts to using the blurriness map alone. between these various extremes, the depth map comes from a weighted combination of the three approaches.

With the depth map determined, TM can then be calculated and scene radiance can be recovered. Preferred embodiments determine TM by measuring the distance from the camera to each scene point. To measure the distance from the camera to each scene point, the distance $d_0$ between the closest scene point and the camera must be estimated as well. Via the maximum difference between the estimated $\tilde{B}^c$ and the observed intensities $I^c$ in the input image, the estimated $\tilde{d}_0 \in [0,1]$ can be calculated by:

$$\tilde{d}_0 = 1 - \max_{x, c \in \{r,g,b\}} \frac{\tilde{B}^c - I^c}{\max(\tilde{B}^K, 1 - \tilde{B}^K)} \quad (17)$$

where $k = \text{argmax}_{c \in \{r,g,b\}}(\max|\tilde{B}^c - I^c|)$. If the BL accounts for a large portion of the observed intensities for the closest scene point, the maximum difference would be small, and $\tilde{d}_0$ would be large indicating that the distance from the camera to the closest object in the scene is long.

The final scene depth $\tilde{d}_f$ can be determined by combining Equations (16) and (17) as follows:

$$\tilde{d}_f(x) = D_\infty \times (\tilde{d}_n(x) + \tilde{d}_0), \quad (18)$$

where $D_\infty$ is a scaling constant for transforming the relative distance to the actual distance.

With $\tilde{d}_f$, the TM for the red channel can be calculated as:

$$\tilde{t}^r(x) = e^{-\beta^r \tilde{d}_f(x)} \quad (19)$$

where $\beta^r \in [\frac{1}{8}, \frac{1}{5}]$ for Ocean Type-I water as a distorting medium. Approximately 98% of the world's open oceans and coastal waters falls into this category so values of $\beta^r$ close to this value represent a preferred embodiment for underwater image restoration. With the red channel TM calculated, the values for the green and blue channels can then be calculated according to relationships between the channels, such as through the residual energy ratios of the color channels, as described by Chiang et al in the context of a wavelength compensation and image dehazing method. J. Y. Chiang and Y.-C. Chen, "Underwater image enhancement by wavelength compensation and dehazing," IEEE Trans. Image Process. vol. 21, pp. 1756-1769, (April 2012). Chiang et al. chose ratios manually, and predetermined ratios can also be selected in preferred embodiments. Another option is automatic calculation. A 2015 publication provides relations among the attenuation coefficients of different color channels based on inherent optical properties of water that are derived from the BL. X. Zhao, J. Tao, and Q. Song. "Deriving inherent optical properties from background color and underwater image enhancement," Ocean Eng., vol. 94, pp. 163-172, (January 2015). The relations are determined as:

$$\frac{\beta^k}{\beta^r} = \frac{B^r(m\lambda^k + i)}{B^k(m\lambda^r + i)}, k \in \{g, b\} \quad (20)$$

where $\lambda^c$, $c \in \{r, g, g\}$ represent the wavelengths of the red, green, and blue channels, and $m = -0.00113$, and $i = 1.62517$. The TMs for the green and blue lights are then calculated by $$t^k = t^r(x)^{\frac{\beta^k}{\beta^r}}, k \in \{g, b\} \quad (21)$$

where $t^r$ is taken from Equation (19) in this preferred embodiment. Testing has also shown the preferred embodiments perform well compared to prior systems and techniques, as indicated by qualitative and quantitative measurement results. Quantitative and qualitative measurement results of the preferred embodiments are reported in Peng and Cosman, "Underwater Image Restoration based on Image Blurriness and Light Absorption," IEEE TRANSACTIONS XXX, VOL. X, NO. X, XXX (2016) and in Peng, Zhao and Cosman, "Single Underwater Image Enhancement using Depth Estimation based on Blurriness," in Proc. IEEE Int. Conf. on Imag. Process. (ICIP), pp. 4952-4956, (September 2015). Experiments discussed above restored images according to Equation (8) in that paper. Specifically, $P_{blr}(x) = F_s\{C_r[P_r(x)]\}$. Then, stretch $P_{blr}(x)$ to a proper range [r0, r1], where r0 is set to [0.3, 0.5] and r1 is 0.9, empirically, denoted as t(x). Then, use $$J(x) = \frac{I(x) - \tilde{B}^c}{t(x)} \tilde{B}^c$$

to calculate the enhanced image J(x).

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for depth estimation in image or video obtained from a distorting medium comprising:
   calculating a pixel blurriness map via one or more of multi-scale low-pass filtering, multi-scale Gaussian-filtering and measuring blurriness in the frequency domain;
   first generating a rough depth map by applying a maximum filter to the pixel blurriness map while assuming depth in a small local patch is uniform with a patch size assigned according to image resolution and/or image content, wherein the rough depth map is a map of distance of pixels from a camera; and
   second generating a final depth map by refining the rough depth map through closing by morphological reconstruction with one or more of guided filtering, hole filling and image matting to secondly generate a resultant depth map that provides a map of normalized relative distance for the scene points of the image for subsequent image enhancement or adjustment processes.

2. The method of claim 1, wherein said calculating calculates a difference between an input image and multi-scale Gaussian-filtered images to estimate the pixel blurriness map.

3. The method of claim 1, wherein said calculating calculates the pixel blurriness map, denoted $P_{init}$, according to $$P_{init}(x) = \frac{1}{n}\sum_{i=1}^{n}(|I_g(x) - G^{r_i,r_i}(x)|)$$

where $r_i = 2^i n + 1$ and $I_g$ is the grayscale version of the input image $I^C$, $G^{r_i,r_i}(x)$ is the input image filtered by a Gaussian filter, and n is a constant.

4. The method of claim 1, wherein said refining comprises both hole filling and image smoothing.

5. The method of claim 4, wherein said hole filling fills holes caused by flat regions in objects.

6. The method of claim 4, wherein said hole filling and image smoothing generate a refined blurriness map, denoted $P_{blr}$, according to $$P_{blr}(x) = F_g\{C_r[P_r(x)]\},$$

where $C_r$ is a hole-filling morphological reconstruction, $F_g$ comprises soft matting or guided filtering and $P_r(x)$ is a rough depth map.

7. The method of claim 1, wherein said calculating and first generating comprise a candidate selection process to select from a plurality of background light (BL) candidates.

8. The method of claim 7, wherein separate BL is determined for separate color channels after the candidate selection.

9. The method of claim 1, wherein said first generating comprises using light absorption with the pixel blurriness map to generate the rough depth map.

10. The method of claim 9, wherein said first generating comprises a plurality of unique depth estimations and further comprises sigmoidally combining the unique depth estimations in view of lighting and image conditions.

11. The method of claim 10, wherein a first depth estimate of the plurality of unique depth estimations is obtained from a red color channel.

12. A method for depth estimation in image or video obtained from a distorting medium comprising:
   calculating a pixel blurriness map;
   generating a rough depth map from the pixel blurriness map while assuming depth in a small local patch is uniform; and
   refining the rough depth map, wherein said calculating calculates the pixel blurriness map, denoted $P_{init}$, according to $$P_{init}(x) = \frac{1}{n}\sum_{i=1}^{n}(|I_g(x) - G^{r_i,r_i}(x)|)$$

where $r_i = 2^i n + 1$ and $I_g$ is the grayscale version of the input image $I^C$, $G^{r_i,r_i}(x)$ is the input image filtered by a Gaussian filter, and n is a constant, and wherein said generating the rough depth map, denoted $P_r$, is determined according to $$P_r(x) = \max_{y \in \Omega(x)} P_{init}(y),$$

where $\Omega(x)$ is a z×z sized local patch centered at pixel x and z is an integer.

13. A method for depth estimation in image or video obtained from a distorting medium comprising:
   calculating a pixel blurriness map;
   generating a rough depth map from the pixel blurriness map while assuming depth in a small local patch is uniform; wherein said calculating and generating comprise a candidate selection process to select from a plurality of background light (BL) candidates; and
   wherein the plurality of BL candidates comprise a top predetermined percentage of blurry pixels in an input image, a variance region within a predetermined lowest variance range and a variance region within a predetermined largest blurriness range.

14. The method of claim 13, wherein the top predetermined percentage is the top 0.1% blurry pixels in the input image.

15. The method of claim 14, wherein the lowest variance region and the largest blurriness region are the same or different regions and are determined by quadtree decomposition.

16. A method for depth estimation in image or video obtained from a distorting medium comprising:
   calculating a pixel blurriness map;
   generating a rough depth map from the pixel blurriness map while assuming depth in a small local patch is uniform; wherein said calculating and generating comprise a candidate selection process to select from a plurality of background light (BL) candidates, wherein said generating is based upon both the pixel blurriness map and light absorption, wherein said generating comprises a plurality of unique depth estimations and further comprises sigmoidally combining the unique depth estimations in view of lighting and image conditions, wherein a first depth estimate is obtained from a red color channel; and wherein a second depth estimate is obtained from a maximum intensity prior that compares the red channel to green and blue channels.

17. The method of claim 16, wherein a third depth estimate is obtained from the image blurriness.

18. A method for depth estimation in image or video obtained from a distorting medium comprising:

generating a first depth map estimate from a red channel map of a scene in the image or video;

generating a second depth map estimate of the scene via a maximum intensity prior comparison of a red channel to the green and blue channels;

generating a third depth map estimate of the scene from a pixel blurriness map while assuming depth in a small local patch is uniform with a patch size assigned according to image resolution and/or image content;

generating a weighted combination of the first, second and third depth map estimates to provide a rough depth map; and refining the rough depth map through closing by one or more of morphological reconstruction with guided filtering, hole filling and image matting to generate a resultant depth map that provides a map of normalized relative distance for the scene points of the image for subsequent image enhancement or adjustment processes.

\* \* \* \* \*